United States Patent
Hall et al.

[19]

[11] Patent Number: 6,147,593
[45] Date of Patent: Nov. 14, 2000

[54] MESSAGE OUTPUT CONTROLLER AND SYSTEM

[76] Inventors: Jeffery Mark Hall, P.O. Box 232 Midland, W.A. 6936; Mark Peter Horwood, P.O. Box 1130 South Perth, W.A. 6951, both of Australia

[21] Appl. No.: 09/043,983
[22] PCT Filed: Sep. 24, 1996
[86] PCT No.: PCT/AU96/00602
 § 371 Date: Oct. 9, 1998
 § 102(e) Date: Oct. 9, 1998
[87] PCT Pub. No.: WO97/13239
 PCT Pub. Date: Apr. 10, 1997

[30] Foreign Application Priority Data

Sep. 29, 1995 [AU] Australia .................. PN5721

[51] Int. Cl.[7] .................................. G08B 5/00
[52] U.S. Cl. .......................... 340/286.11; 340/286.01; 340/309.15; 340/328; 340/384.1
[58] Field of Search .................. 340/69.2, 825.35, 340/286.01, 286.11, 286.02, 309.15, 328, 326, 384.1, 384.7; 360/69, 12; 369/19

[56] References Cited

U.S. PATENT DOCUMENTS

| | | | |
|---|---|---|---|
| 4,454,670 | 6/1984 | Bachmann et al. | 40/584 |
| 4,670,798 | 6/1987 | Campbell et al. | |
| 4,912,457 | 3/1990 | Ladd | 340/692 |
| 4,984,098 | 1/1991 | Buntsis. | |
| 5,032,716 | 7/1991 | Lam et al. | 250/221 |
| 5,134,716 | 7/1992 | Craig | 369/29 |
| 5,264,822 | 11/1993 | Vogelman et al. | 340/692 |
| 5,642,484 | 6/1997 | Harrison, III et al. | 395/214 |
| 5,657,004 | 8/1997 | Whittaker et al. | 340/692 |

FOREIGN PATENT DOCUMENTS

| | | |
|---|---|---|
| 90935/82 | 3/1983 | Australia . |
| 421941 | 4/1991 | European Pat. Off. . |
| WO91/09402 | 6/1991 | WIPO . |

OTHER PUBLICATIONS

Derwent JAPIO, AN93–035203, Fujita Corp., Feb. 12, 1993.

*Primary Examiner*—Brent A. Swarthout
*Attorney, Agent, or Firm*—Ying-kit Lau, JD

[57] ABSTRACT

A message output controller (103) which receives continuous pre-recorded advertising messages from a master message playing device and console (101). The system incorporating several controllers (103) and a single console (101) is intended to be installed in a fuel service station, to provide advertising at fuel dispenser pumps. The console (101) plays messages continuously with a tone or the like between each message. The console (101) may include other features such as a public address (PA) system (111 and 113). The controllers (103) each receive the messages, but the messages are not played until a person is proximal, indicated by sensing (141) the nozzle being lifted in the fuel dispenser pump, and the tone or the like indicating a transition between messages being decoded (137). The result is that only complete messages are played at the controller (103). A local message playback device (105) may be included in the message output controller (103), to play a welcome message immediately the nozzle is lifted.

10 Claims, 13 Drawing Sheets

MESSAGE OUTPUT CONTROLLER AND SYSTEM

CROSS-REFERENCES TO RELATED APPLICATIONS

None

STATEMENT REGARDING FEDERALLY SPONSORED RESEARCH OR DEVELOPMENT

None

BACKGROUND OF THE INVENTION

1. Field of the Invention

The present invention relates to the field of advertising and/or provision of information. Specifically, this invention relates to a controller for controlling the output of messages to a target audience.

2. Description of the Related Art Including Information Disclosed Under 37 CFR 1.97 and 1.98

It has become a practice for retailers and other providers of goods and services to advertise their wares or services, in proximity to the point of sale, often using public address systems and the like to extol the virtues of their products or services. Such public address systems play a pre-recorded message, or in some circumstances a live announcement to members of the public, often on a continuous basis.

BRIEF SUMMARY OF THE INVENTION

The inventors have sought to provide a system for delivery of messages or advertising, to potential customers or other target audiences, in a more personable and less intrusive manner.

In accordance with one aspect of the present invention there is provided a message output-controller having a first input for receiving continuously played sequential message items from a message playing device, a second input for receiving a signal indicative of the proximity of a target audience for message items, means for detecting a transition between successive message items, and a controller means to enable commencement of playing a message item on detecting said transition when said signal has indicated or indicates the proximity of said target audience.

In the case of an audio message, the means for detecting said transition may either detect a period of silence between successive message items, or detect an index signal placed between successive message items at the point where message items originate. The latter may include an audible or inaudible tone pulse or the like recorded between successive message items on a cassette tape of prerecorded message items, or a pulse signal or the like produced in an apparatus where the message items originate. In the case of a tone signal, the means for detecting said transition may be a tone decoder circuit or the like.

It will be understood that the message playing device may include a cassette tape or other storage/retrieval means such as digital storage media in the form of electronic memory or a computer hard disk drive in a digital audio record/playback device.

In the case of visual messages for production on a video screen, the means for detecting said transition may detect a signal encoded between successive message items at the point where message items originate.

With this message output controller, once a target audience is detected, a message will not commence playing until the end of a message in progress. This ensures that the target audience is not subjected to the end of a message or an incomplete message which may be meaningless.

However as the message output controller may be silent for a period initially once the presence of a target audience is determined, it is preferred that the message output controller includes a local message playback device for playing an introductory or welcome message immediately on the second input receiving the signal, and before the transition is detected.

Preferably said controller is arranged to continue playing the current message item until a next said transition is reached, whereupon if said signal indicates that said target audience is not proximal, said controller will disable playing of further said message items.

Alternatively, in a less preferred arrangement, said controller is arranged to disable playing of said message items immediately upon said signal indicating that said target audience is not proximal.

In accordance with a second aspect of the invention there is provided a vending machine having a message output controller as hereinbefore described.

Preferably said vending machine comprises a fuel dispensing machine.

Preferably said fuel dispensing machine is of the type having at least one dispensing nozzle and a station for receiving the nozzle when not in use, wherein said second input is arranged to receive said signal indicative of whether a said dispensing nozzle has been removed from its station, and said controller commences playing said message item on detecting said transition when said signal has indicated or indicates that a said nozzle has been removed from its station.

Preferably said second input is connected to a switch arranged to change state on removal or replacement of said nozzle from or into said station.

The switch may conveniently be the same switch which activates the electrical pump in the fuel dispensing machine.

In the case of a fuel dispensing machine having two or more nozzles located closely together, there should be a switch associated with each said nozzle and station, whereupon the switches are wired in parallel so that in a situation where more than one nozzle is in use said controller will disable playing of further said message items in response to the last nozzle being replaced in its station. However in a fuel dispensing machine where the nozzles are located on opposite sides of the fuel dispensing machine, two separate message output controllers would be employed in the fuel dispensing machine.

In accordance with a third aspect of the present invention there is provided a message output system comprising a master message playing device which is adapted to continuously play sequential message items, and a plurality of message output controllers as described in the previous aspects of the invention, arranged to receive the sequential message items.

The master message playing device may be located in a convenient position such as in an office or at a sales processing point, remotely from the message output controllers. The message output controllers may be located in discrete vending machines or other apparatus, linked by hardwiring or by radio frequency transmission. While the system is intended for use with vending machines which are typically used by a customer for a period of time of between one and four minutes, and used by a large number of customers in a day (such as a fuel dispenser or petrol bowser), the system could be easily adapted for relaying advertising to people using shopping trolleys in supermarkets. With such a use, the second inputs of the message output controller would need to be connected to sense when the shopping trolley is in use, perhaps sensing capacitance changes when the handle by which the trolley is pushed, is being held, or by sensing output from appropriate motion detecting circuitry.

In a preferred arrangement, the master message playing device includes an intercom function to enable a voice message to be sent to one, more, or all of the message output controllers. Such a function can be used to relay an individual message or an emergency announcement.

Preferably each message output controller is adapted to be individually accessible by the intercom function so that an emergency announcement or operating instructions or some other message can be sent to the appropriate message output controllers as required.

BRIEF DESCRIPTION OF THE SEVERAL VIEWS OF THE DRAWING

The invention will now be described in the following description of one specific embodiment thereof, made with reference to the drawings, in which.

DETAILED DESCRIPTION OF THE INVENTION

Figure 1:
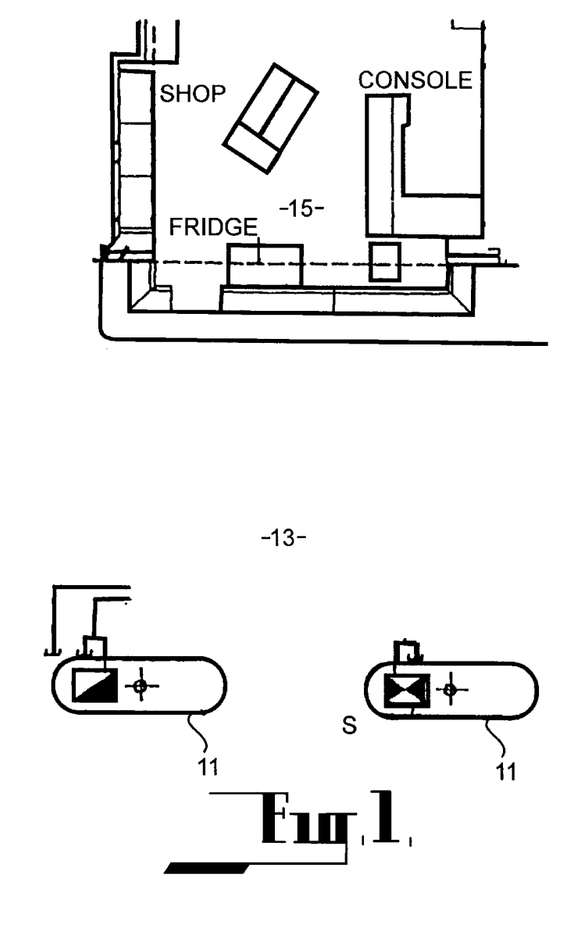
FIG. 1 is a plan view showing part of the forecourt of a typical outlet for the sale of liquid fuel and/or compressed/liquefied gas (petrol, diesel, gasoline, and/or LPG, CNG, LNG), in which the embodiment may be utilized.

The embodiments are directed toward an announcement system in a self service automotive fuel sales outlet or service station. The general scheme of a typical sales outlet of this type is shown in FIG. 1, and comprises a number of fuel dispenser enclosures 11 (otherwise commonly referred to as bowsers), located on a forecourt 13, and supervised from a shop 15.

Figure 2:
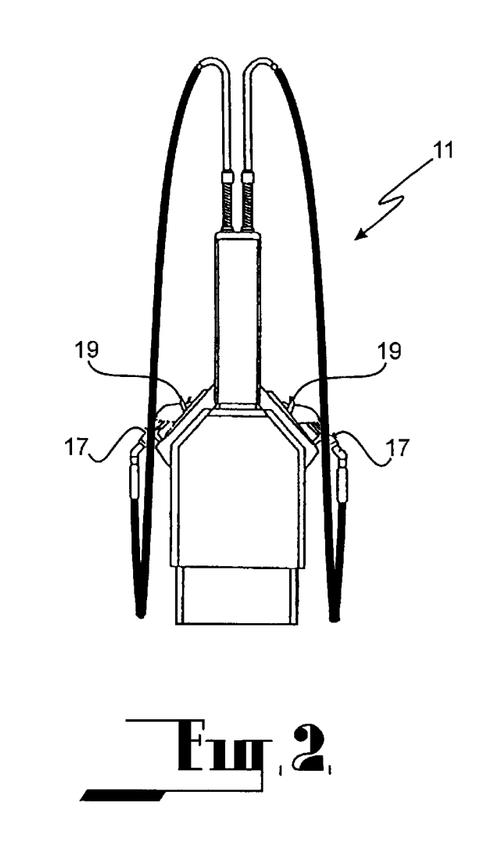
FIG. 2 is a side view of a fuel dispensing machine (bowser) in which the embodiment may be utilized.

Each fuel dispenser enclosure 11 may be of the type shown in FIG. 2, comprising two hand dispensers 17 each having a fuel dispensing nozzle 19, which when not in use are received in stations (not shown) in the dispenser 11. It will be understood that the dispensing enclosures 11 in which the embodiment is utilised may have only one hand dispenser 17, or may have three or more such hand dispensers.

Figure 3:
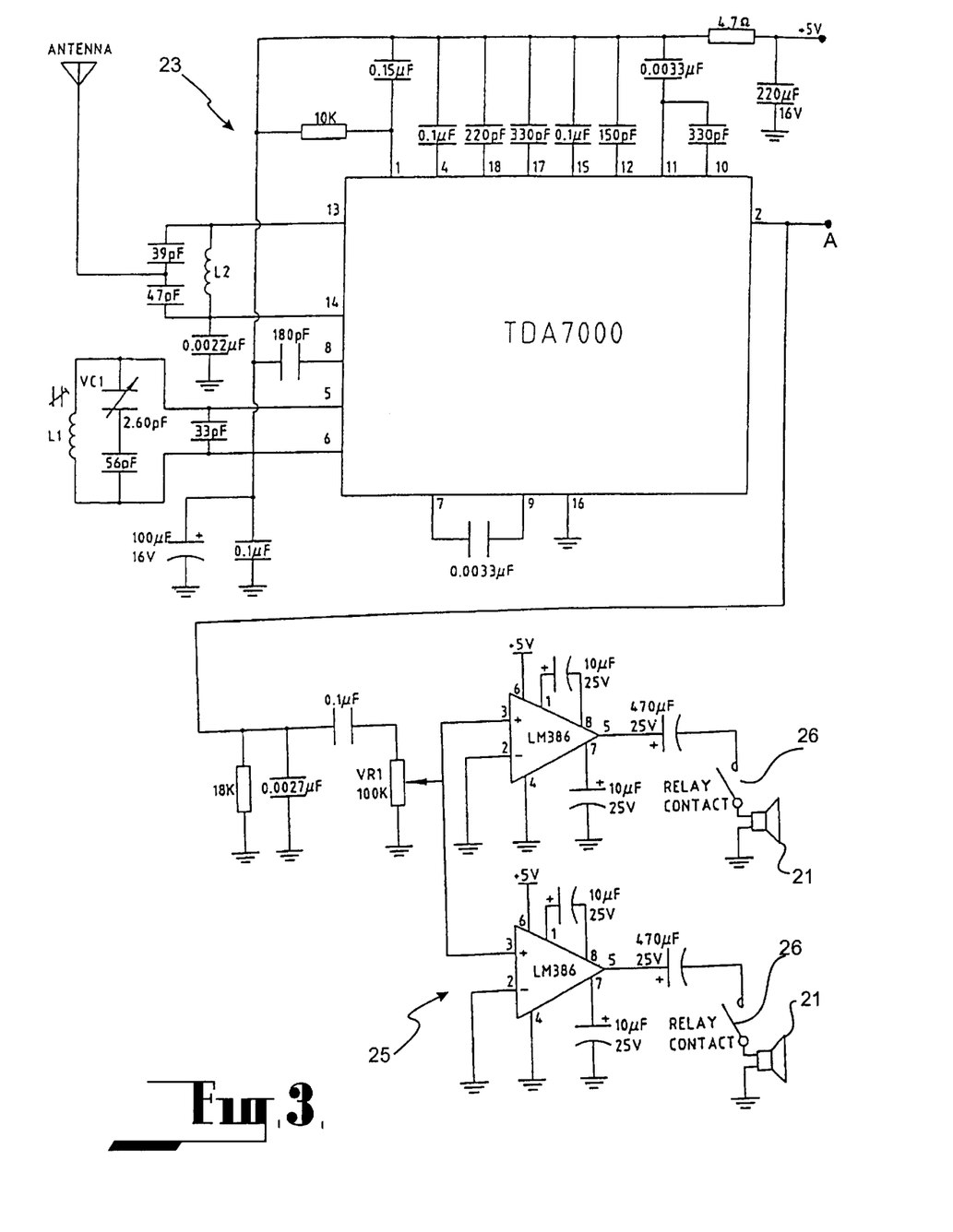
FIG. 3 is a circuit diagram of a receiver and amplifier stage in the embodiment.
Figure 4:
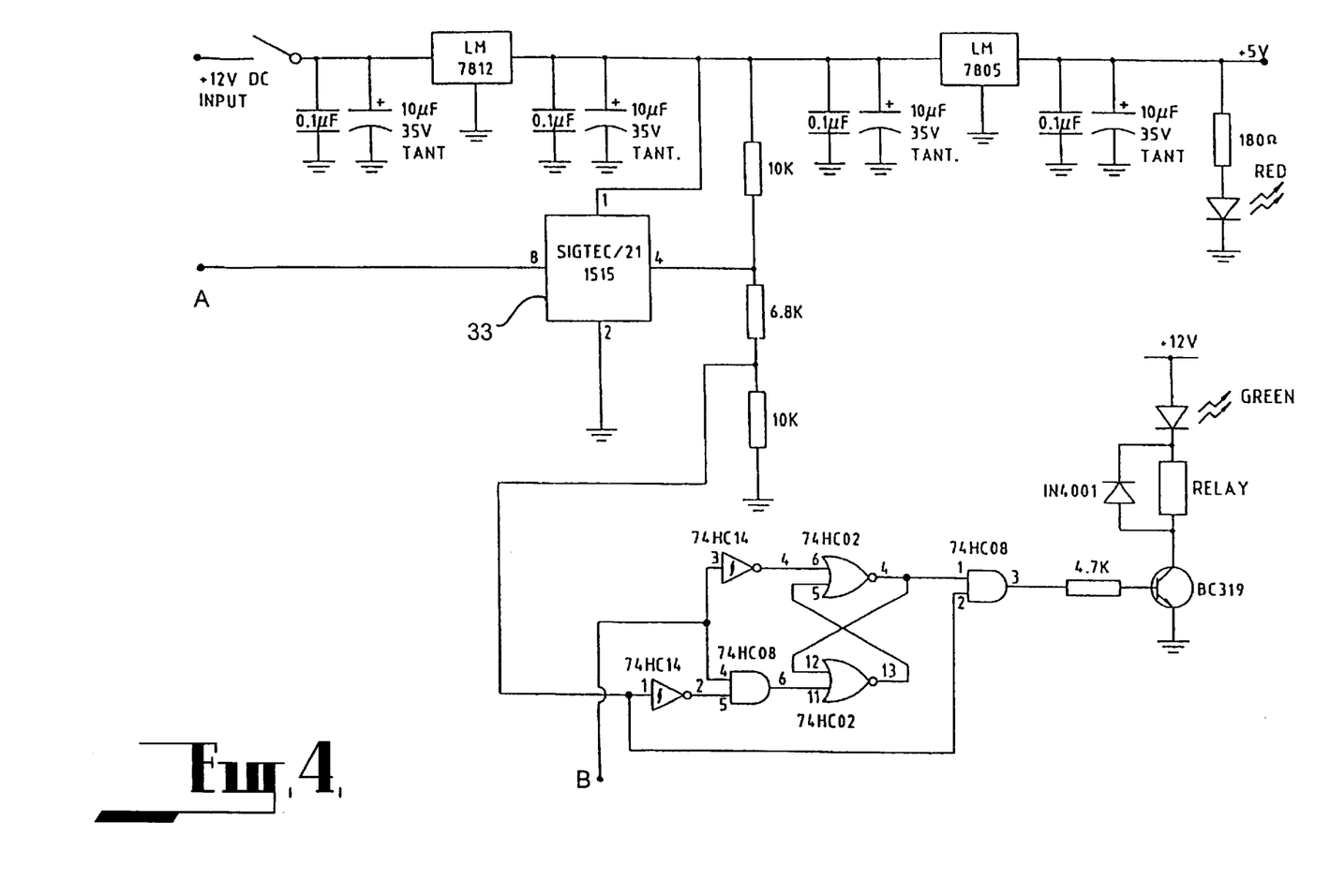
FIG. 4 is a circuit diagram of part of the control circuit in the embodiment.
Figure 5:
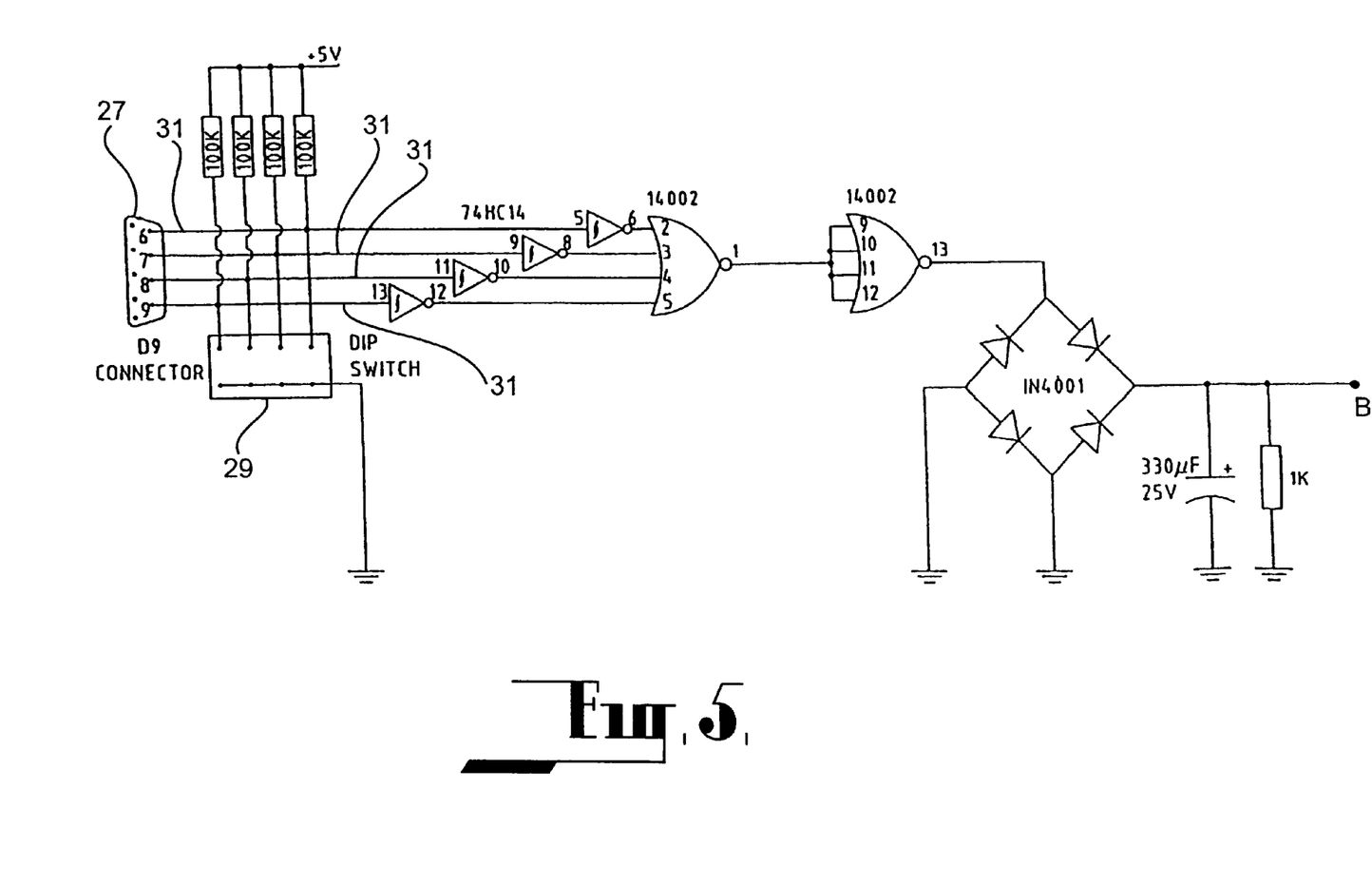
FIG. 5 is a circuit diagram of circuitry in the embodiment, for detecting when a nozzle has been removed from its station.

The first embodiment comprises an apparatus, the circuit diagram for which is shown in FIGS. 3 to 5, for controlling the output of audio messages from speakers 21 located within the dispenser 11. One apparatus according to the embodiment is placed in each dispenser 11 in the sales outlet.

Referring to FIG. 3, a fixed frequency FM receiver 23 which is based around a TDA7000 integrated circuit manufactured by Phillips, is provided to receive a sequence of messages. An audio signal comprising the sequence of messages is derived at pin 2 of the TDA7000, and is fed via an attenuator VR1 to a pair of audio amplifiers 25 based around LM386 integrated circuits manufactured by National Semiconductor. The audio output derived at pin 2 of the TDA7000 is presented at point "A" in the circuit, for feeding to point"A" shown in FIG. 4.

Each amplified audio output from the amplifiers 25 is switched through a set of contacts of a relay, which are normally held open, so that the amplified audio signal does not reach the speakers 21, unless the relay contacts close, as is described hereafter.

A transmitter (not shown) is located in the shop 15, and transmits FM radio signals to the FM receivers 23 in apparatus located in each fuel dispenser enclosure 11. The frequency of transmission and reception are set to the same frequency, which should be outside the commercial fm radio band and away from other designated frequency channels in order to comply with requirements for such devices, which will depend on the applicable regulations in the country in which the transmitter is to be used. An audio input comprising a single prerecorded message from a digital recorder/player circuit is configured to play repeatedly, and is fed into the transmitter. The message is arranged so that a 100 millisecond 1 kHz tone is placed at the start thereof.

It will be understood that the tone could be at any audio frequency which is within hearing range, but be filtered out by a notch filter in the circuitry, so as not to appear at the speakers 21, or alternatively, the tone could be at a supersonic frequency. In this embodiment, the tone is not filtered out by a filter circuit, as will be understood. It will also be understood that the audio input to the transmitter may comprise a string of pre-recorded messages, each separated by a tone. The messages may be played from a cassette tape or from the hard disk of a computer.

Referring to FIG. 5, a 9-pin D connector 27 receives incoming signals from switch circuits associated with each dispensing nozzle 17/handpiece 19. The circuit can accommodate a maximum of four such inputs, which each input connecting to a schmidt trigger inverter to clean any switch bounce or other interference originating in the dispenser enclosure 11. A dip switch 29 comprising four switches, one switch for each input line 31 for receiving incoming signals, is provided to ground any unused inputs, in the event that a dispenser enclosure 11 having less than four fuel dispensing nozzles 19 is utilised. The operation of the circuit is such that the output at pin 13 of the cmos 14002 circuit goes high if any one of the input lines 31 goes high, in response to a nozzle 19 being removed from its station. This signal is conditioned by the bridge rectifier and RC network, before being fed to the remainder of the controller (point "B").

It will be understood that existing switch circuitry which starts the fuel pump in each dispenser enclosure 11 on removal of a nozzle 19 from its station (usually also controlled from the shop 15 to prevent theft), may be utilised to provide a feed to the D connector 27, or separate microswitches may be installed to sense the nozzle/handpiece proximity, if it is desired to isolate the apparatus of the embodiment from the circuitry in the dispenser enclosure 11.

The output at point "A" is fed to a tone sequential encoder/decoder 33 "SIGTEC/21, 1515", supplied by Signalling Technology Pty Ltd of Australia. This component is a programmable micro-controller, which is programmed to go high (at its output pin 4) for a period of 20 seconds on detecting a tone from the receiver 23, whereafter it goes low until receipt of the next tone. This timing is based on the length of the recorded message.

When the signal at point "B" is not at logic level 0, and is at a sufficient level to trigger the schmidt trigger inverter, as soon as the output of the encoder/decoder 33 next goes high, the relay is energised, the relay contacts 26 are closed, enabling the speakers 21 to reproduce messages received by the apparatus.

When the next 1 kHz tone is received, the output of the encoder/decoder will go low momentarily, causing the relay to be de-energised, preventing reproduction of the 1 kHz tone at the speakers 21.

As soon as the nozzle is replaced in its station, the relay is de-energised, stopping reproduction of sound at the speakers 21.

While this embodiment is set to reproduce fixed length messages, a skilled technician or engineer will readily appreciate that the controller circuitry may be changed so that the messages may be of variable length. For example, this may be achieved changing the output of the encoder/decoder 33 to produce a short low going pulse on receipt of the 1 kHz tone It will be understood that with the arrangement of the embodiment, any messages will not commence part way through, but will commence at the beginning thereof. While the messages will stop when the nozzle is replaced in its station, it would be straightforward to modify the controller so that the playing of any message would continue until its end is reached. Such a modification, and others described herein are considered to be within the scope of the embodiment.

The second embodiment of the invention, shown in FIGS. 6 to 14, is similar to the first embodiment and provides for the continuous transmission of pre-recorded advertising messages which are originated in a master message playing device 101 in the form of a console, which may be conveniently located in the main office or shop 15 of a service station. The messages are output through a message output controller 103 at a fuel dispenser 11 or fuel pump, while the fuel dispenser is being used by motorists. However the system of this embodiment also incorporates extra features not present in the first embodiment. The extra features include a public address (PA) system, remote volume control of the audio output at each fuel dispenser, and the provision of a welcome message originated locally from a local message playback device 105 included in the message output controller 103, which is played at the pump immediately the nozzle 19 is lifted from the dispenser 11.

The public address facility provides for interruption of any prerecorded messages being delivered by the fuel dispenser, to allow for delivery of an announcement, instructions or messages from the service station staff through a microphone to any one or all of the fuel dispensers. In the event of an emergency this facility can be used to deliver automatic prerecorded emergency, warning or evacuation messages, or standard siren sounds combined with messages, at the fuel dispenser.

The message output controllers 103 which are placed inside the fuel dispensers 11 provide for complete prerecorded messages such as advertising, to be played at the fuel dispenser 11, at which a dispensing nozzle 19 is lifted for the dispensing of fuel. In this embodiment, the prerecorded messages are fm transmitted from the remotely located master message playing device 101 at a frequency of 77.3 Mhz, although the frequency may be varied to avoid causing or receiving interference from other facilities which may be using this frequency. Indeed the modulation method of transmission is not critical. The reason that radio linking has been chosen is to allow for retro-fitting without having to place wiring at an existing installation. At a new installation, hard wiring between the message playing device and the separate message output controllers might be contemplated, obviating the need to use radio linking.

The playback of messages which have originated from the master message playing device 101 commences at the relevant fuel dispenser only when the tone indicating the start of a new message is detected concurrently with the nozzle having been lifted from the fuel dispenser. Messages are then played continuously at the relevant fuel dispenser, until the nozzle is replaced in the fuel dispenser, whereupon the message currently being played will continue until the message is completed and the next tone is received.

The local message playback device may be arranged to play a welcome message or the like, immediately the nozzle 19 is lifted from the fuel dispenser 11, and prior to the receipt of the tone indicating the start of a message originating from the master message playing device 101.

Figure 6:
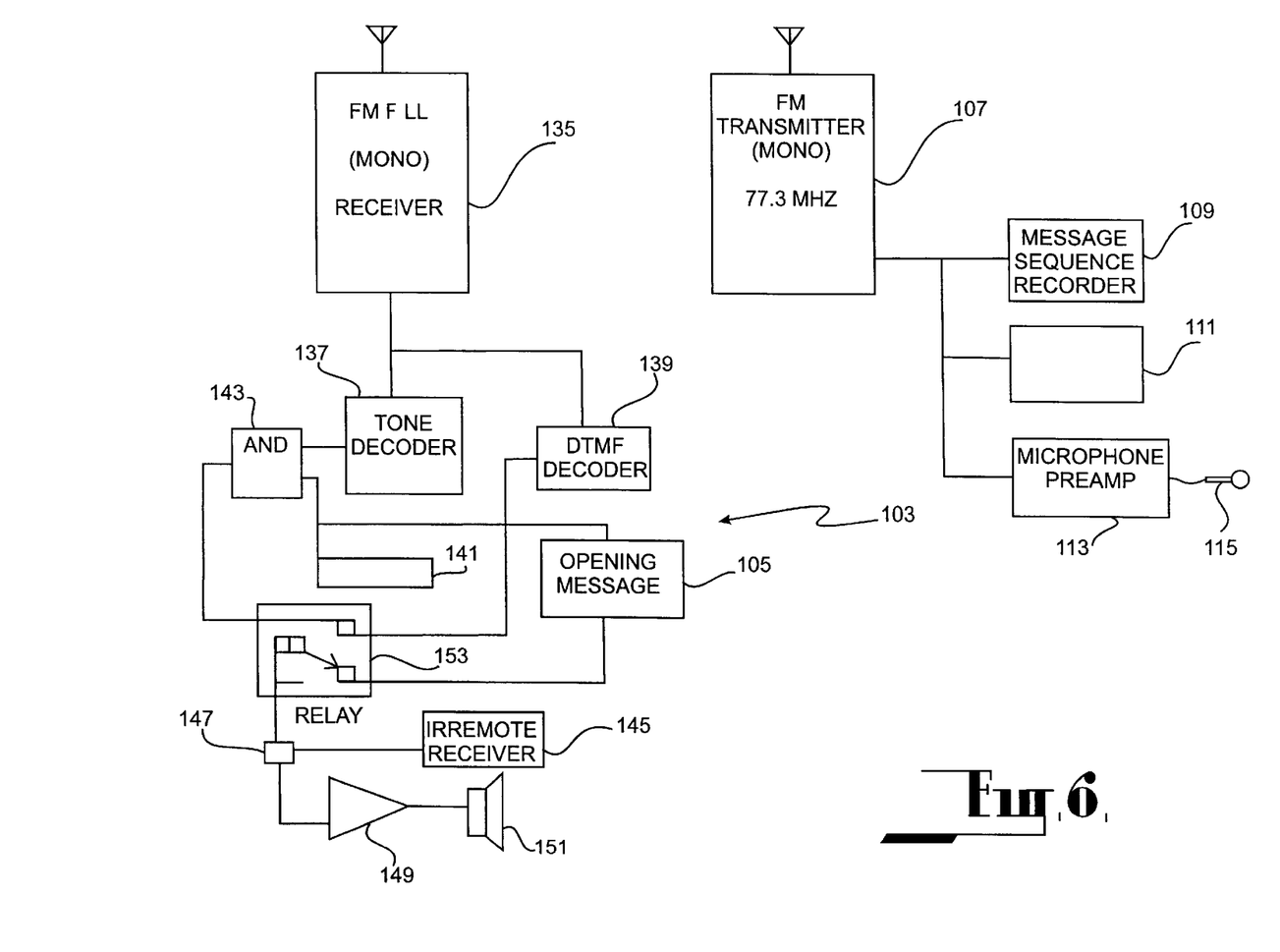
FIG. 6 is a block diagram of the message output system according to the second embodiment.

Referring to FIG. 6 the master message playing device 101 is illustrated, and includes an fm radio transmitter 107 which is provided with input to be transmitted from three sources, a digital recorder/player 109, a PA controller 111, and a microphone preamplifier 113 to which may be connected a microphone 115. It will be understood that a higher output level inherent in some microphone types may obviate the need for the preamplifier 113.

The transmitter 107 is preset to transmit at 77.3 MHz, although as discussed above this frequency may be varied in order to suit local requirements. The maximum allowable transmitter power is 100 mW, although this may also vary in different jurisdictions. There are a number of manufacturers of single chip fm transmitter circuits and also complete transmitter circuit modules, which can be employed for this embodiment, and accordingly the transmitter is not discussed further.

Figure 7:
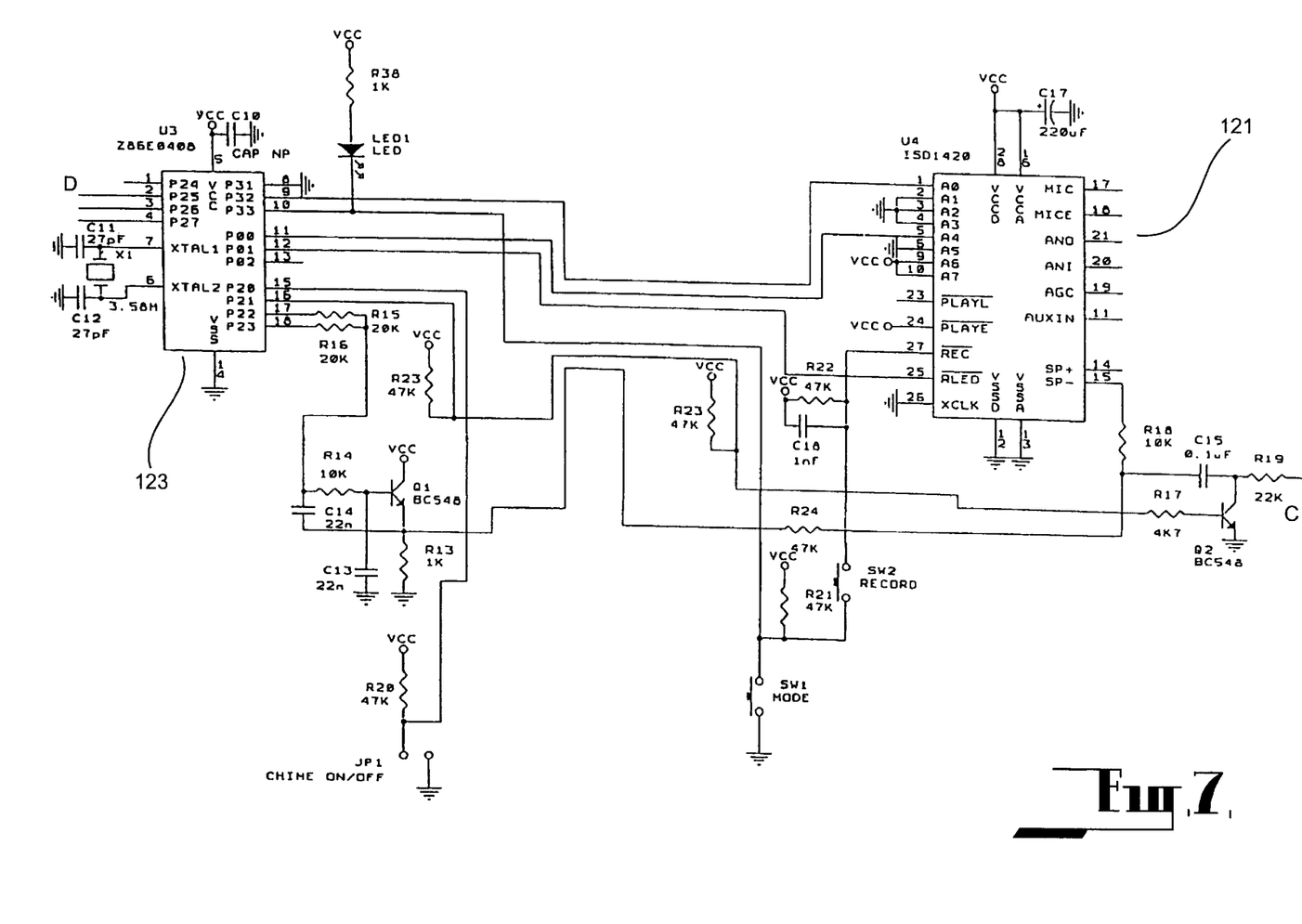
FIGS. 7 to 9 are circuit schematics of parts of the master message playing device of the second embodiment.
Figure 8:
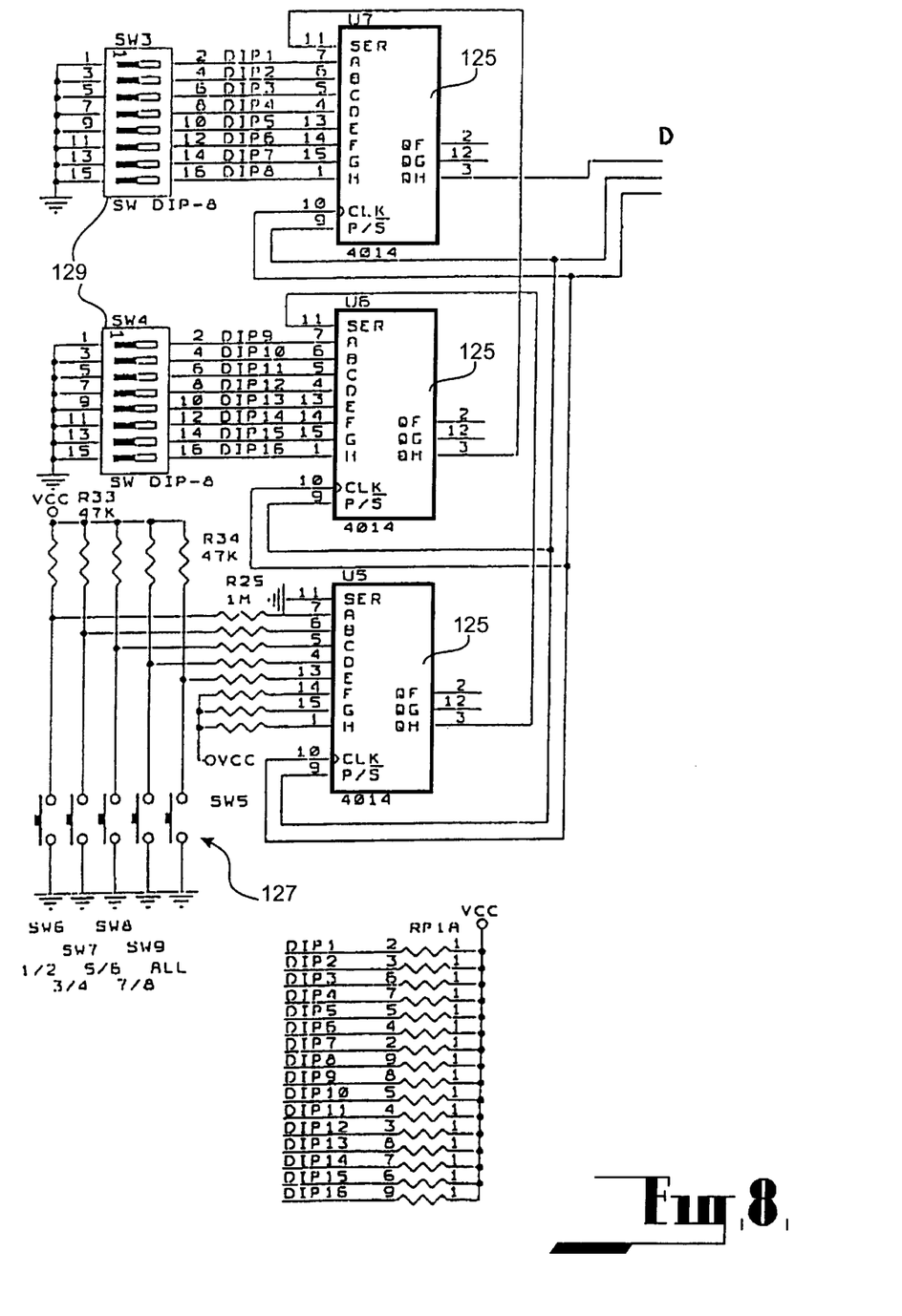

Referring to FIGS. 7 and 8 the control circuitry for the PA controller 111 of the master message playing device 101 is shown. The PA controller 111 includes a digital audio record/play chip 121, the ISD1420 (U4) supplied by Information Storage Devices, of California, USA. The digital audio record/play chip 121 stores the DTMF tones to address each individual message output controller 103 independently of other message output controllers, for PA announcement purposes. Each individual DTMF tone is preceded by a SIGTEC "6" tone (reset) signal, which silences output at all of the message output controllers. The digital audio record/play chip 121 also stores standard evacuation messages and siren sound signals, for use if there is an emergency which requires evacuation and playback of warnings in the absence of service station staff.

Associated with the digital audio record/play chip 121 is a Z86E0408 (U3) micro-controller chip 123 supplied by Zilog. The micro-controller chip 123 controls the operation of the digital audio record/play chip 121, and is fed input via three eight-bit parallel-in/serial-out shift registers 125, which are 4014 cmos chips (U5–U7). There are 5 trigger inputs 127 identified as 1/2, 3/4, 5/6, 7/8, and ALL, which relate to dispensing enclosures 11 for nozzles 19 containing pumps 1 and 2, pumps 3 and 4, pumps 5 and 6, pumps 7 and 8, and all dispensing enclosures, respectively. These trigger inputs 127 are switches mounted on the console facia of the master message playing device 101. Input option DIP switches 129 are provided to set up the program to be played by the master message playing device 101, The trigger inputs 127 select which pumps on the service station forecourt would receive any emergency message from the microphone preamplifier 113. The PA controller 111 and the messsage sequence recorder/player 109 are linked so that if the PA function or any emergency announcement function is required, playback of messages from the messsage sequence recorder/player 109 will be suspended.

Figure 9:
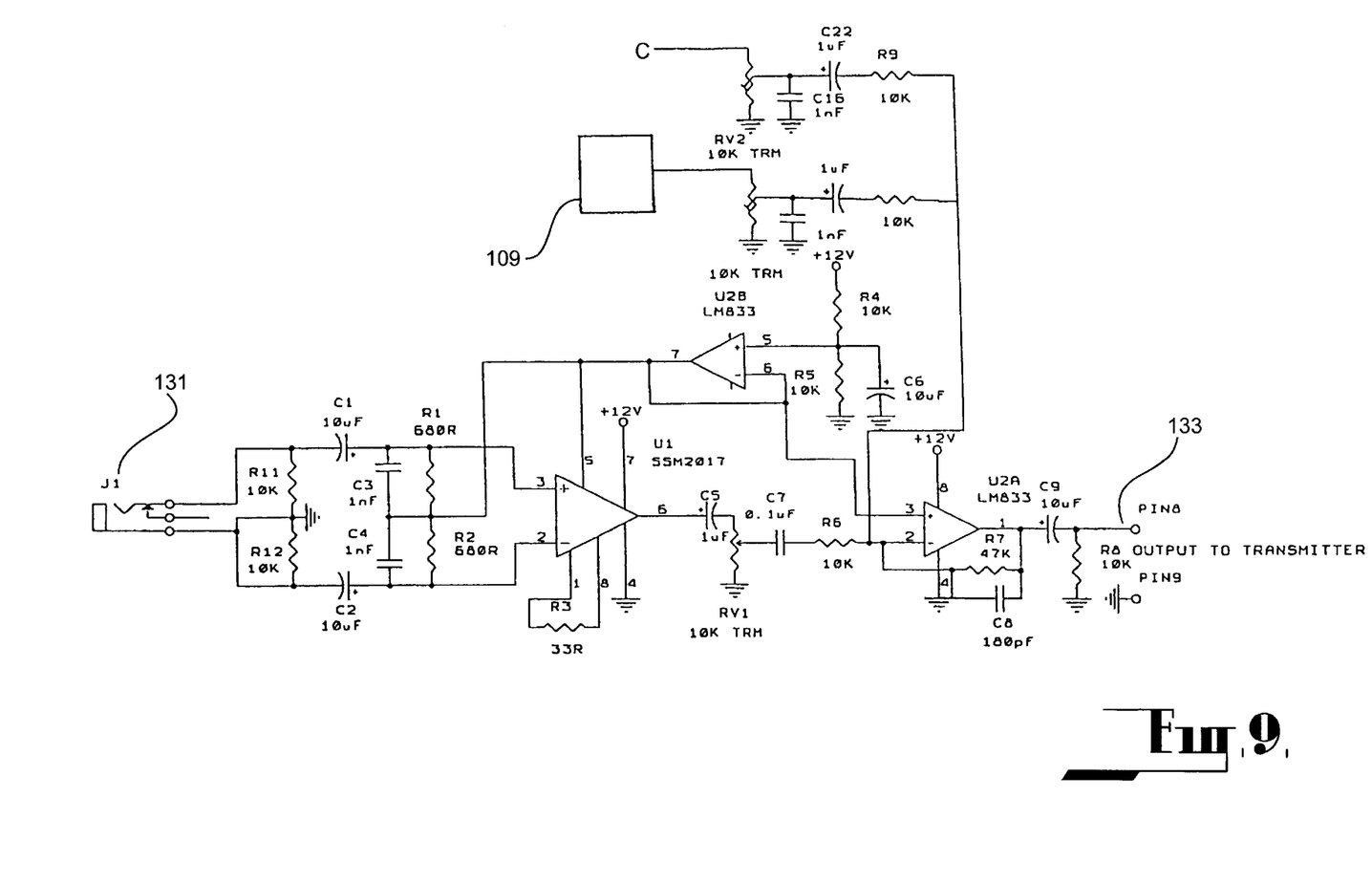

The microphone preamplifier 113 is illustrated in FIG. 9, and is a balanced input type with an input impedance of 680Ω as set by R1 and R2. It has a jack 131, into which a microphone may be plugged. The output of the preamplifier is mixed with the output C (see also FIG. 7) from the P A controller 111, and the output of the messsage sequence recorder/player 109, and fed to a further preamp stage U2A, the output 133 of which is fed to the transmitter 107.

In the master message playing device 101, groups of messages can be digitally recorded in the messsage sequence recorder/player 109. The messages are recorded on eight ISD 2560 chips supplied by Information Storage Devices, of California, USA, which are cascaded, and controlled by a micro controller much in the same manner as the arrangement in the PA controller 111. With a sample speed of 8 kHz, 8 minutes of messages advertising different products or services, or providing imformation to customers, may be recorded. The advertising messages are recorded sequentially on each ISD 2560 chip, with a maximum message duration of 19.5 seconds. There is an intervening period of 1.5 seconds between messages during which a 10 mili second tone (actually the SIGTEC "five" tone signal) is stored, 0.5 seconds before commencement of the next message. The maximum message length of 19.5 seconds is determined by the programming of the SIGTEC sequential tone decoder, as will be understood from the discussion of the message output controller 103 which follows. A message time of 19.5 seconds has been determined based on audience attention span, and to allow playing of an optimal number of messages in the time that a customer would be in attendance at a fuel dispenser. If a shorter message is required, a SIGTEC "6" tone should be included at the end of the message and immediately before the SIGTEC "5" tone, to reset the SIGTEC sequential tone decoder in the message output controllers 103 and avoid a period where there is no message at the message output controllers 103.

It will be understood that the functions of the messsage sequence recorder/player 109 may be fulfilled by any audio record/playback device, such as a computer with a sound card or capabilities, or an audio cassette recorder.

Referring to FIG. 6, a block diagram of the message output controller 103 of the second embodiment is shown. The message output controller has the following functional blocks:

an fm, monaural, frequency locked loop (FLL) radio receiver 135,
Sigtec sequential five tone decoder 137,
DTMF (Dual tone multiple frequency) tone decoder 139
local message playback device 105
second input in the form of a nozzle input signal conditioning circuit 141,
relay latching and gating logic circuitry 143,
remote volume control circuit 145, and associated potentiometer 147 an audio amplifier circuit 149 and loud speaker 151.

As discussed above, the transmitter 107 in the master message playing device continuously transmits the recorded messages, and the FLL fm receiver is tuned at the same frequency to receive these messages. While the nozzle 19 of the dispenser 17 is received in its holding station, and the message output controller is in standby mode, there is no audio output from the speaker, as the signal feed is open circuit through the relay 153. As soon as the nozzle 19 is lifted (indicating the proximity of a target audience), the opening message stored in the local message playback device 105, begins to play.

When the Sigtec sequential five tone decoder 137 decodes a valid "5" tone while the nozzle 19 remains lifted the relay 153 is energised for 20 seconds, as following the decoding of the tones, the output of the tone decoder 137 is programmed to stay high for 20 seconds. During this 20 second period the audio output is heard through the speaker, after which the tone decoder 137 output goes low and the relay is de-energised, and hence no audio output is heard via the speaker. If the decoder 137 receives another valid "5" tone while the nozzle 19 remains lifted, its output goes high again for another 20 seconds, and the audio output is again heard through the speaker, playing the next message. This cycle continues until the nozzle 11 is hung up, or the "5" tone decoder is reset for Public Address (PA) message. When the nozzle 19 is hung up the currently running message continues to be played through the speaker until the tone decoder 137 completes the 20 second high period (or until a SIGTEC "6" tone (reset) signal is received).

If PA messages are to be received the advertising messages must first be suspended, and a "6" tone reset sent to the tone decoder 137, which when received sends the output of the tone decoder 137 low immediately. Following this a tone addressing a particular message output controller 103 is sent from the master message playing device. The DTMF decoder 139 receives this tone, and if it is valid for the particular message output controller, the DTMF decoder 139 output goes high and sets an RS latch high, the output of which energises the relay and turns on the speaker output. Now the PA message could be heard at the selected fuel dispenser containing the addressed message output controller until the tone decoder 137 receives a valid tone, which resets the DTMF RS latch 165, and the advertising cycle may recommence.

For a global PA message, the SIGTEC "5" tone (set tone) is sent before the PA message begins. Thus, if this tone is sent, all of the message output devices 103 respond and the message is heard at all of the fuel dispensers 11 at which nozzles are lifted.

Figure 10:
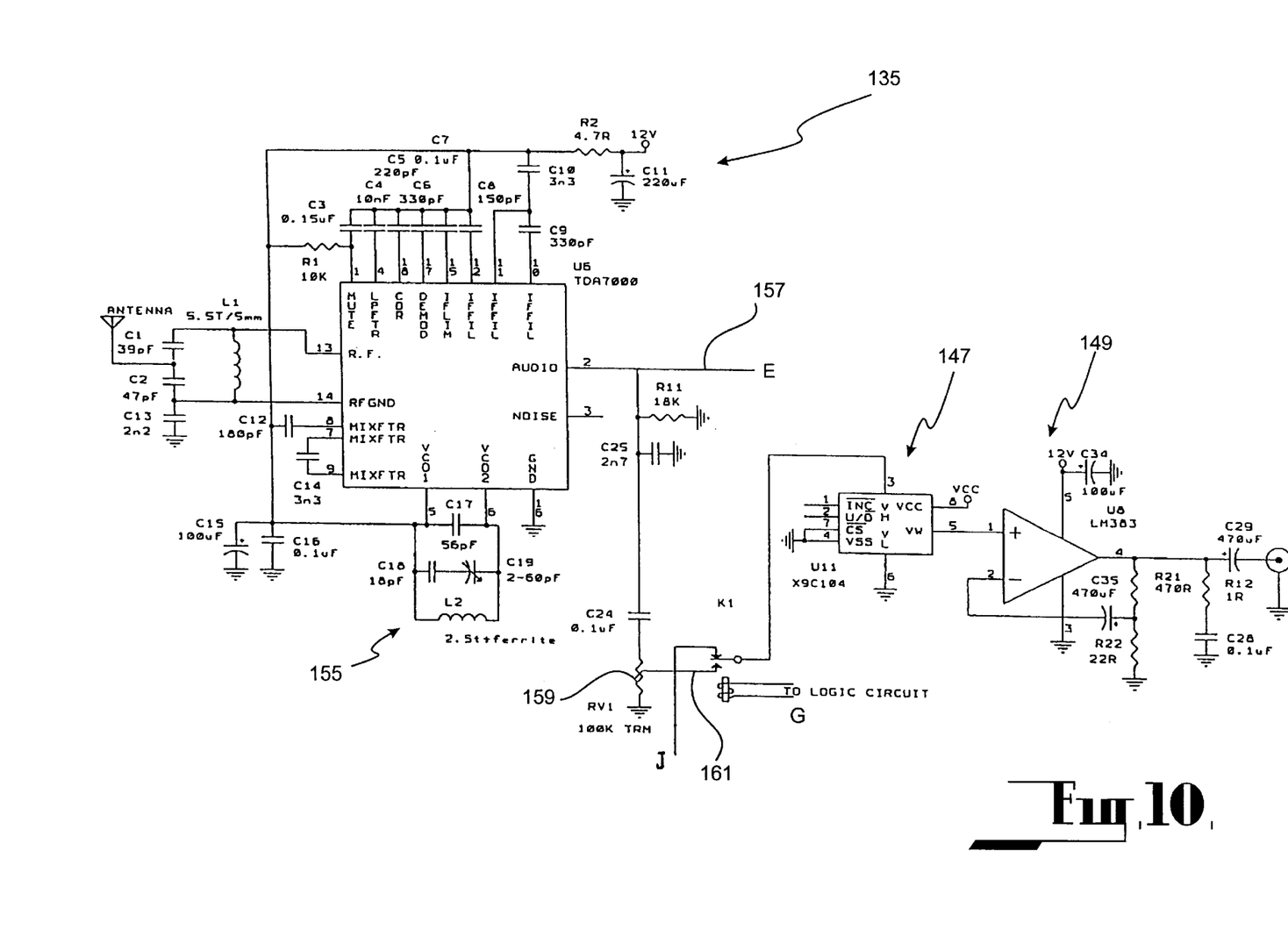
FIGS. 10 to 14 are circuit schematics of parts of the message output controller of the second embodiment.

Relevant circuitry in the message output controller, which is illustrated in FIGS. 10 to 14, will now be discussed. Referring to FIG. 10, the fm, monaural, frequency locked loop (FLL) radio receiver 135 utilises the Phillips TDA7000 fm radio circuit IC. The reader is referred to application notes published by its manufacturer, if an understanding of the circuitry directly associated with the TDA7000 is required. The local oscillator 155 (VCO) requires adjustment during alignment. All the other components, with the exception of the tuning capacitor C19, are fixed.

The transmitted fm rf signal is picked up by the antenna and fed to the TDA7000 internal mixer (pins 13 & 14), via a bandpass filter consisting of inductor L1 and capacitors C1 and C2. The bandpass filter eliminates interference by filtering signals that lie outside the desired tuning range. The audio output 157 is fed via a preset potentiometer 159 which allows adjustment of the audio signal level, to normally open contacts 161 of the relay 153. The common connection for the contacts of the relay 153 is connected to a solid state potentiometer circuit X9C104 (147), which is controlled by a remote control circuit (not shown) which is connected to pins 1 and 2 of the X9C104 device. The output of the X9C104 device is fed to audio amplifier 149 formed around a LM383 integrated circuit.

The audio output 157 is also fed (legend E in FIGS. 10 and 11) to the SIGTEC 1515/21, 5 Tone Encoder/Decoder 137 and the DTMF Decoder 139 for signal controlling of the message output controller 103. The S1515/21 5 Tone encoder/decoder 137 is a miniature tone-sequential encoder/decoder supplied by Signalling Technology Pty Ltd. This device provides group call decoding to the Sigtec Standard Group Format. All of the S1515/21 devices in the message output controllers 103 at a particular site are programmed identically, so that they all respond to the same 'SET' and 'RESET' tones respectively. Signal input is via pin 8 and the output 163 is from pin 4. The devices are programmed so that the output 163 stays high for a period of 20 seconds following a successful decoding of a valid sequential "5" tone (SET tone). When a valid sequential "6" tone (reset tone) is decoded the output 163 goes low immediately.

Figure 11:
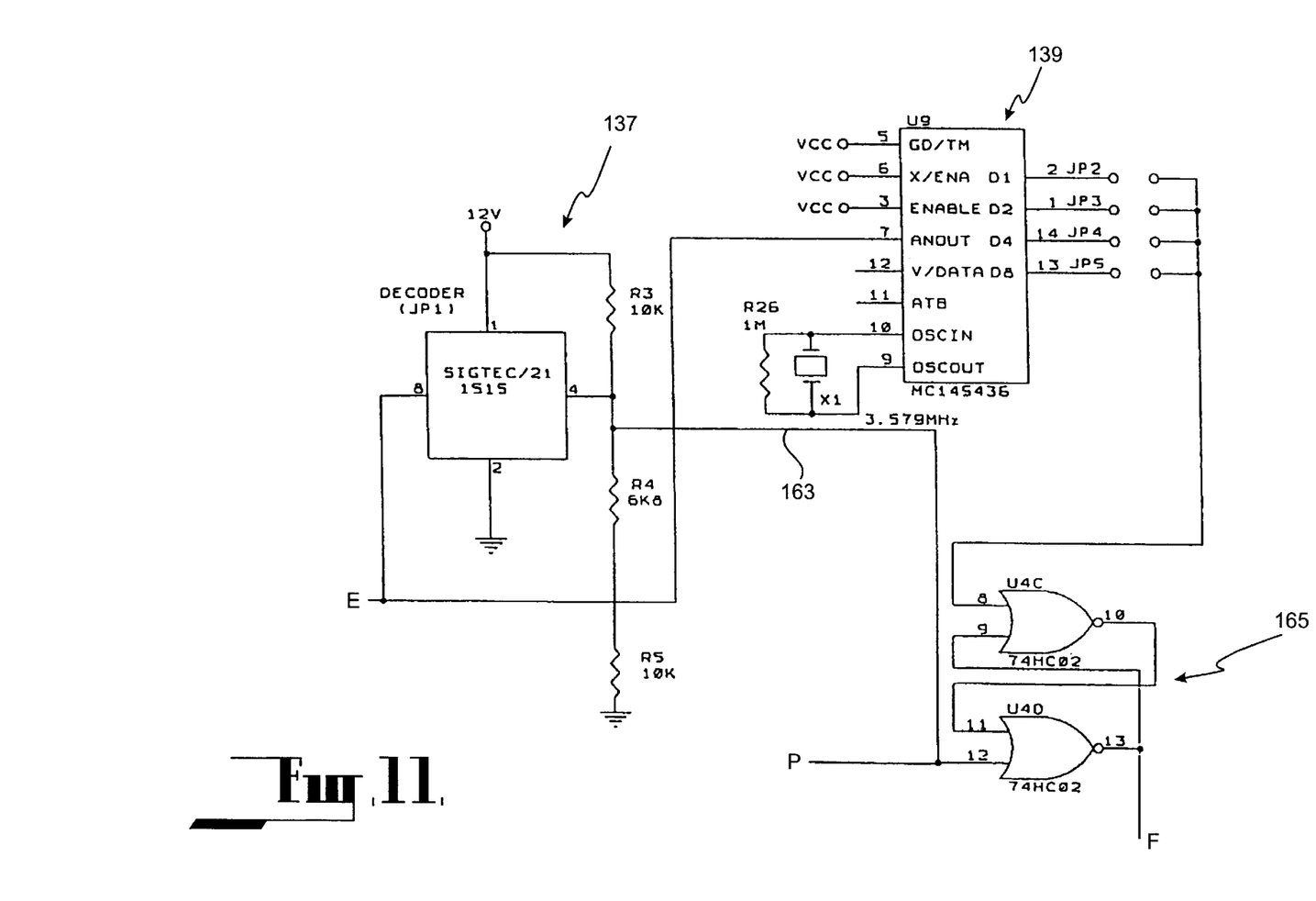

The DTMF Decoder 139 is based around Motorola's MC 145436A, which is a low power silicon gate CMOS LSI device containing the filter and decoder for detection of a pair of tones conforming to the DTMF standard with outputs in hexadecimal. The DTMF decoder 139, in conjunction with the RS Latch 165 performs the selective latching of the relay for individual message output controllers 103, when the master message playing device 101 sends its specific SET tone, which was described earlier in the PA Console operation. Following this the microphone signal will be received by the selected Radio Decoder. When the Radio Decoder receives a valid SIGTEC SET tone, the DTMF Latch will reset.

Figure 14:
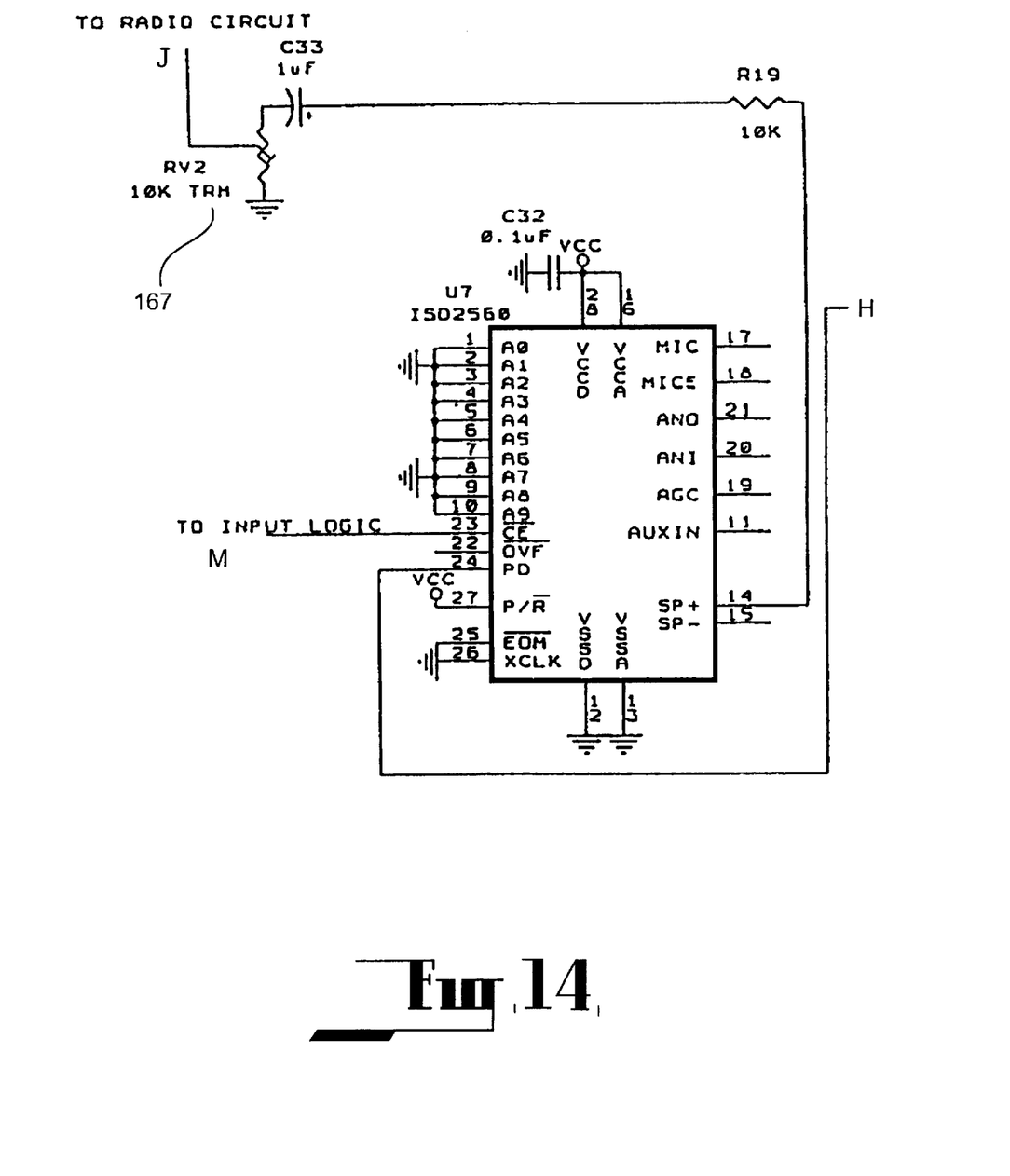

The local message playback device 105 is shown in more detail in FIG. 14. This is intended to provide an opening welcome message, and is based around a ISD 2560 Single-Chip Voice recorder/playback IC. Its output is fed to a preset potentiometer 167 which allows adjustment of the audio signal level, before it is fed to the normally-closed contact of relay 153.

Figure 12:
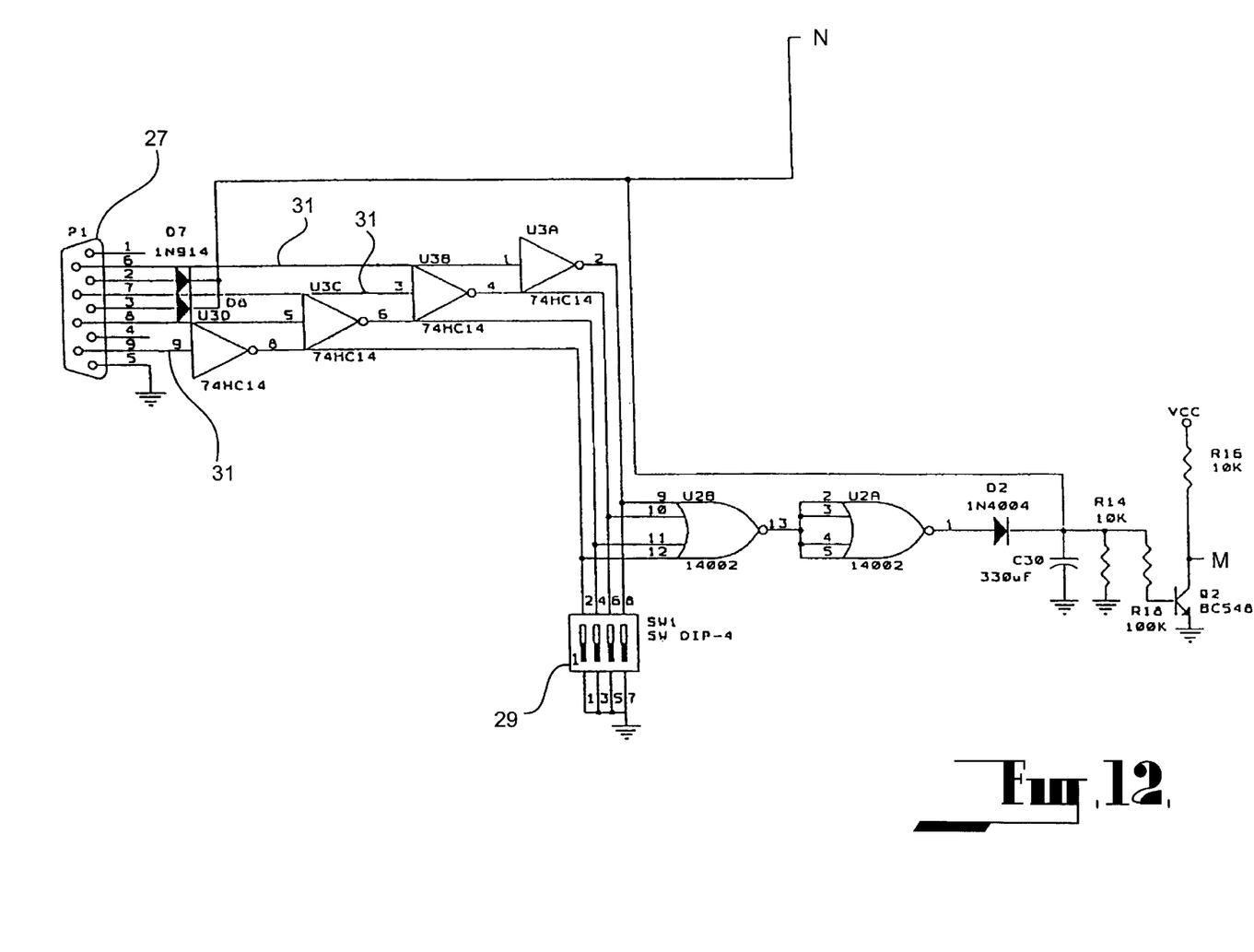

As shown in FIG. 12 all signals from switches associated with nozzles 17 of the fuel dispensers 11 enter the message output device through the 9 pin D connector socket 27. PEC pump signals are detected from the change of state of it's polling. This is fed through 74HC14 schmidt trigger IC for de-bouncing and wave shaping, and fed via the DIP switch 29 which are used to set inputs for 1,2,3,4, nozzle dispensers. Normally a 3 hose MPP dispenser will have switches 1,2,3 in 'off' position. (When any one of the switches are 'ON' that input will be permanently tied LOW to GND). The signals are then 'OR'ed through 14002 IC and conditioned via D2, R14, & C30, which has a time constant of 3.3 seconds. The final signal at point M is a definite a HIGH (+5V) if the nozzle is lifted, and a definite LOW (0V), if the nozzle is in rest state. The final signal at point M is used to trigger the local message playback device 105, and also to control the speaker logic circuit.

Figure 13:
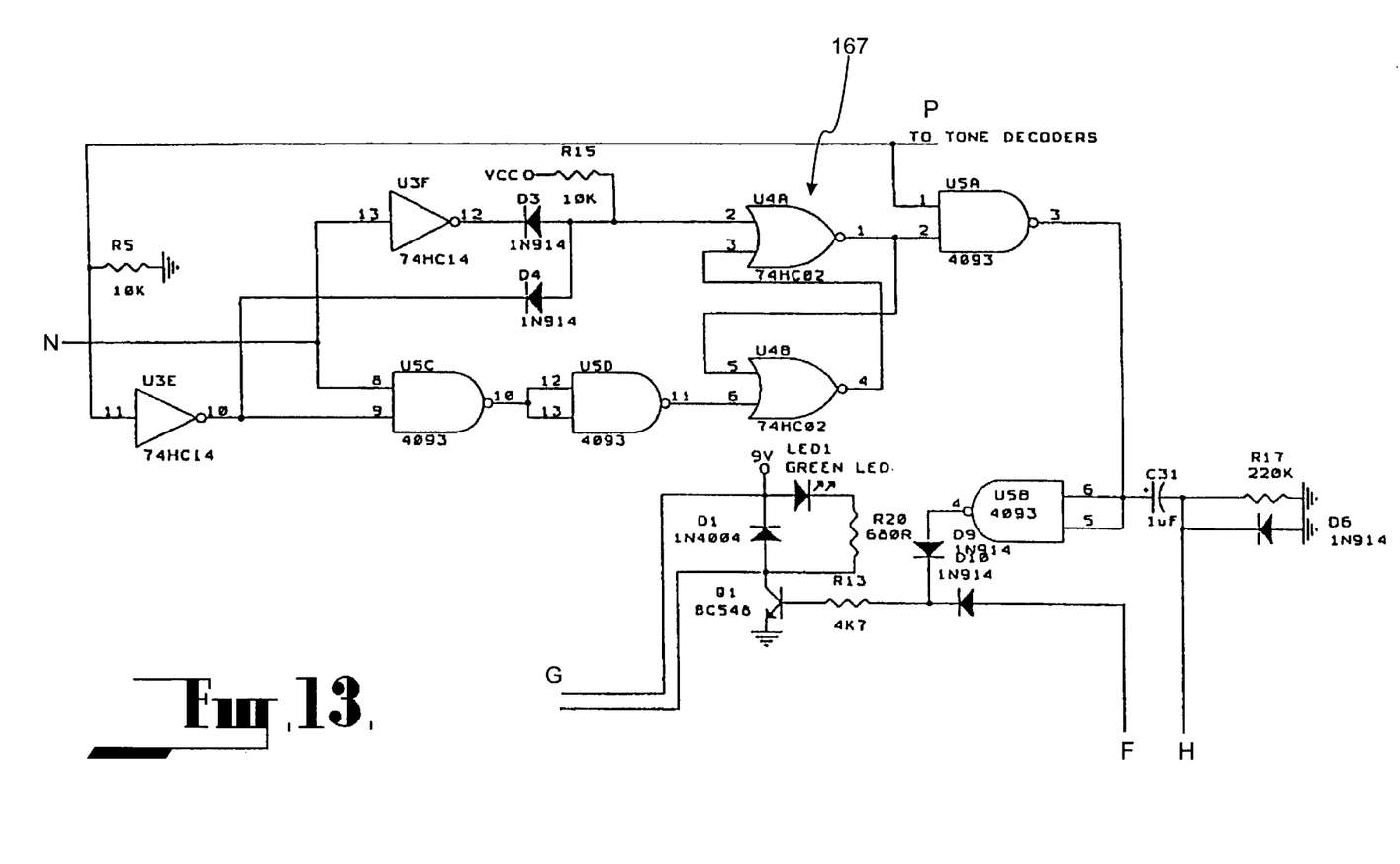

Referring to FIGS. 11 to 13, when the nozzle is lifted a HIGH also appears at pin 8 of 4093 NAND gate, via connection N. When there is no SIGTEC output from connection P, pin 10 of 74HC14 stays HIGH and is fed to pin 9 of U5. These two HIGH signals produce a HIGH at pin 1 of U4 (R-S Latch 167), which is fed to pin 2 of U5. When S1515/21 decodes a 5 tone a HIGH from pin 4 of thereof appears at pin 1 of U5, via connection P. These two signals combined trigger the relay through Q1. After 20 seconds, when the S1515/21 output goes low Q1 switches OFF, hence the relay is de-energised. When S1515/21 decodes another "5" tone, as long as the nozzle remains lifted, Q1 will turn the relay ON for another 20 seconds. This cycle continuous till the nozzle is hung up. When the nozzle is hung up a HIGH appears at pin 12 of U3, but pin 10 of U3 will remain LOW for the remainder of the S1515/21 HIGH 20 second period, and then goes HIGH. Then the outputs of U3 pins 10 and 12 are ANDed by D3 and D4 to produce a HIGH at pin 2 of U4, which resets the R-S Latch 167, and switches off the relay. The circuit also responds similarly to S1515/21's RESET tone.

The system described in either embodiment enables message/advertising announcement at a number of locations where message output controllers are installed, from a single common source. The control of playback of the messages/advertising at the message output controllers, results in played material being heard from its beginning, providing playback of messages and advertising to a target audience, in an unobtrusive and tasteful manner, when compared with an arrangement that commenced playing messages as soon as a target audience was detected (a nozzle lifted on a fuel dispenser), without regard as to whether the message was part way through or otherwise.

It will be appreciated that modifications may be made to either embodiment, which modifications would fall within the scope of the invention. It should be appreciated that the scope of the invention is not limited to the scope of these embodiments described herein.

What is claimed is:

1. A message output system comprising a master message playing device and a plurality of message output-controllers; the master message playing device being characterized by, in use, playing a sequence of separate message items continuously one after another; each said message output-controller having a first input for receiving said sequence of message items from said master message playing device, a second input for receiving a proximity signal indicative of the proximity of a target audience for message items, characterized by each said message output-controller having means for detecting a transition between the end of one message item and the beginning of a next message item in said sequence, and a controller means to enable commencement of playing said next message item to said target audience at the message output-controller at which said target audience was or is detected, on detecting said transition when said proximity signal has been or is present, each enabled controller outputting the same message in synchronism with any other enabled controller in the system that is playing a message to a target audience.

2. A message output system as claimed in claim 1 wherein the message items are audio messages, and in each said message output-controller, the means for detecting said transition detects a period of silence between the end of one message item and the beginning of a next message item in said sequence.

3. A message output system as claimed in claim 1 wherein the message items are audio messages having an index signal placed at the end of each message and before the beginning of the next message in said sequence, and in each said message output-controller the means for detecting said transition detects said index signal.

4. A message output system message output-controller as claimed in claim 3 wherein said index signal includes either an audible or inaudible tone and said means for detecting a tone decoder circuit responsive to said tone.

5. A message output system as claimed in claim 1 wherein a local message playback device is included in each said message output-controller for playing a local introductory or welcome message immediately on the second input receiving said proximity signal, and before said transition is detected.

6. A message output system as claimed in claim 1 wherein each said message output-controller is, once playing of a message item has commenced, adapted to continue playing the current message item until a next said transition is reached, whereupon if said proximity signal ceases to indicate that said target audience is proximal, said controller means will disable playing of further said message items.

7. A message output system as claimed in claim 1 wherein in each said message output-controller said controller means is arranged to disable playing of said message items immediately upon said proximity signal ceasing to indicate that said target audience is proximal.

8. A message output system as claimed in claim 1 wherein each said message output-controller are located in a vending machine or other apparatus, linked by hardwiring or by radio frequency transmission to said master message playing device.

9. A message output system as claimed in claim 1 wherein the master message playing device includes an intercom function to enable a voice message to be sent to one or more, or all of the message output controllers.

10. A message output system as claimed in claim 9 wherein each message output-controller is adapted to be individually accessible by the intercom function.

* * * * *